United States Patent
Park et al.

(10) Patent No.: US 9,769,773 B1
(45) Date of Patent: Sep. 19, 2017

(54) CONTROLLING PER-CARRIER MAXIMUM TRANSMIT POWER OF A DEVICE SERVED ON A PLURALITY OF CARRIERS

(71) Applicant: Sprint Spectrum L.P., Overland Park, KS (US)

(72) Inventors: Sungki Park, Ashburn, VA (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/401,848

(22) Filed: Jan. 9, 2017

(51) Int. Cl.
*H04W 52/04* (2009.01)
*H04W 52/36* (2009.01)

(52) U.S. Cl.
CPC ....... *H04W 52/367* (2013.01); *H04W 52/365* (2013.01)

(58) Field of Classification Search
CPC .... H04L 5/00; H04W 52/146; H04W 52/242; H04W 52/365; Y02B 60/50
USPC ..... 455/69, 522, 509, 127.1, 67.11, 68, 512, 455/511, 445, 500, 517, 550.1, 426.1, 455/426.2, 513, 423, 450, 451, 452.2, 455/432.1, 422.1; 370/329, 335, 328, 370/432, 310, 318, 342; 375/260, 267, 375/141
See application file for complete search history.

(56) References Cited

U.S. PATENT DOCUMENTS

| | | | |
|---|---|---|---|
| 7,787,525 B1 * | 8/2010 | Clark, Jr. .............. | E21B 47/122 340/855.4 |
| 8,565,146 B2 * | 10/2013 | Zhang .................. | H04L 5/0046 370/318 |
| 8,855,061 B2 * | 10/2014 | Heo ..................... | H04W 52/365 370/329 |
| 9,002,391 B1 * | 4/2015 | Goyal ................. | H04W 52/365 379/328 |
| 2003/0026324 A1 * | 2/2003 | Li ......................... | H04W 52/08 375/141 |
| 2003/0087660 A1 * | 5/2003 | Sendonaris ......... | H04W 52/226 455/522 |
| 2004/0106412 A1 * | 6/2004 | Laroia .................. | H04W 16/12 455/448 |
| 2009/0197632 A1 * | 8/2009 | Ghosh .................. | H04W 52/24 455/522 |
| 2010/0113004 A1 * | 5/2010 | Cave ................... | H04W 52/365 455/422.1 |
| 2010/0157895 A1 * | 6/2010 | Pani .................... | H04W 52/346 370/328 |

(Continued)

*Primary Examiner* — Tan H Trinh

(57) ABSTRACT

A base station could establish maximum transmit power that the WCD should apply per carrier when serving the WCD on multiple carriers, with the base station considering the WCD's total power headroom and a delta of the WCD's uplink receive power per carrier. For instance, the base station could determine the WCD's total power headroom and could determine a receive power delta per carrier, the base station could effectively re-distribute the WCD's total power headroom among the carriers as adjustments to the maximum transmit power per carrier in accordance with a relative comparison of the receive power deltas on the carriers, the base station could further shift the adjustments to keep the sum of the WCD's maximum transmit power of the carriers in line with the WCD's maximum total transmit power, and the base station could direct the WCD to apply the shifted adjusted maximum transmit values.

20 Claims, 5 Drawing Sheets

(56) References Cited

U.S. PATENT DOCUMENTS

| | | | |
|---|---|---|---|
| 2010/0202431 A1* | 8/2010 | Kazmi | H04B 7/0426 370/342 |
| 2011/0021197 A1* | 1/2011 | Ngai | H04W 36/30 455/436 |
| 2011/0256863 A1* | 10/2011 | Ramasamy | H04W 24/08 455/424 |
| 2011/0275335 A1* | 11/2011 | Luo | H04W 52/281 455/127.1 |
| 2012/0052903 A1* | 3/2012 | Han | H04W 52/146 455/522 |
| 2012/0135728 A1* | 5/2012 | Karpoor | H04W 48/16 455/432.1 |
| 2012/0135777 A1* | 5/2012 | Karpoor | H04W 52/40 455/522 |
| 2012/0188947 A1* | 7/2012 | Larsson | H04W 52/146 370/328 |
| 2012/0257531 A1* | 10/2012 | Ko | H04B 7/0417 370/252 |
| 2013/0064131 A1* | 3/2013 | Kwon | H04L 5/0007 370/252 |
| 2014/0241237 A1* | 8/2014 | Speight | H04W 52/46 370/315 |
| 2016/0192350 A1* | 6/2016 | Yi | H04W 52/146 370/329 |
| 2017/0013564 A1* | 1/2017 | Yi | H04W 52/36 |

* cited by examiner

CONTROLLING PER-CARRIER MAXIMUM TRANSMIT POWER OF A DEVICE SERVED ON A PLURALITY OF CARRIERS

BACKGROUND

A typical wireless communication system includes a number of base stations each radiating to provide coverage in which to serve wireless communication devices (WCDs) such as cell phones, tablet computers, tracking devices, embedded wireless modules, and other wirelessly equipped devices. In turn, each base station may sit as a node on a core access network that includes entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a system may operate in accordance with a particular air interface protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), Global System for Mobile Communications (GSM), IEEE 802.11 (WIFI), BLUETOOTH, and others.

In accordance with the air interface protocol, a base station may provide service on one or more carriers, each spanning particular radio-frequency on which communications can flow wirelessly between the base station and WCDs. Such a carrier could be structured to provide a downlink for carrying communications from the base station to WCDs and an uplink for carrying communications from WCDs to the base station. For instance, the carrier could be frequency division duplex (FDD), with separate frequency ranges provided respectively for downlink and uplink communication, or time division duplex (TDD), with a single frequency range being time division multiplexed between downlink and uplink use.

Through modulation or other means on the carrier, the downlink and uplink could then be structured to define various channels for carrying communications between the base station and WCDs. For instance, the downlink could be structured to define one or more traffic channels for carrying bearer data from the base station to WCDs and one or more control channels for carrying control signaling from the base station to WCDs. And the uplink could define one or more traffic channels for carrying bearer data from WCDs to the base station and one or more control channels for carrying control signaling from WCDs to the base station.

OVERVIEW

When a base station serves a WCD on a carrier, the base station and WCD may engage in an uplink power control process to control the power at which the WCD outputs air interface transmission to the base station. In a representative power control process, for instance, the base station could determine how the receive strength of transmissions from the WCD compares with a target receive strength (set based on a desired target error rate or the like) and could control the WCD's transmission power accordingly. In particular, if the uplink receive strength is higher than the target receive strength, then the base station could command the WCD to incrementally reduce its transmit power, and the WCD could responsively do so. And if the uplink receive strength is lower than the target receive strength, then the base station could command the WCD to incrementally increase its transmit power, and the WCD could responsively do so.

In practice, a WCD may also be equipped with a power amplifier and/or associated logic that supports a specified maximum uplink transmit power level, i.e., a highest power level at which the UE is capable of transmitting. This maximum transmit power level might be dictated by a manufacturer, by government regulations, by user setting, or in some other manner. In any event, as a base station and WCD engage in the uplink power control process, the WCD's transmit power could be restricted to be no greater than this maximum level.

Further, when a base station is serving a WCD, the WCD's maximum transmit power could impact how the base station serves the WCD. For example, at any given time, the difference between the WCD's maximum transmit power and the transmit power that the WCD is currently set to use (e.g., based on the power control process) would define the WCD's remaining available transmit power or "power headroom." In practice, the WCD could report this power headroom to the base station periodically or in response to other trigger events, and the base station could use the reported power headroom as a basis to control certain service parameters, such as how large a block of uplink air interface resources the base station would allocate for transmission by the WCD in a given time interval.

While these processes can work well when a base station serves a WCD on a single carrier, a complication can arise when a base station serves a WCD concurrently on multiple carriers, such as with "carrier aggregation" service as defined under LTE and perhaps other industry standard protocols.

When a base station serves a WCD on multiple carriers at once, the WCD may engage in uplink transmission concurrently on the multiple carriers. Further, given possible differences in path loss and other channel conditions between the carriers, the base station and WCD could manage and consider the WCD's uplink transmission power on a per-carrier basis. For instance, the base station and WCD could engage in the above-described power control process respectively for each carrier to control the WCD's transmit power separately per carrier, and the WCD could report its power headroom respectively for each carrier to enable the base station to control resource allocation to the WCD separately per carrier. To facilitate these processes, however, the WCD's maximum transmit power would need to be allocated in some manner among the carriers, so that the WCD could suitably limit its transmit power per carrier and could compute and report its associated power headroom per carrier for instance.

One way to allocate the WCD's maximum transmit power among the multiple carriers on which the WCD is being served is to simply divide the maximum transmit power equally among the carriers, or perhaps divide the maximum transmit power proportionately among the carriers based on the carriers' respective frequency bandwidths or the like (if different). However, such allocation of the WCD's maximum transmit power would not take into account the base station's uplink receive power from the WCD respectively per carrier or the target receive power that the base station is set to apply per carrier for the WCD. Yet those factors could be relevant in practice.

Disclosed herein is an improved method and system to facilitate allocation of a WCD's maximum transmit power among multiple carriers on which the WCD is being served.

The disclosed method and system could assume to start that the WCD's maximum transmit power is allocated in some default manner among the multiple carriers, such as that the maximum transmit power is divided equally among the carriers, or is allocated among the carriers based on the bandwidths or other carrier attributes.

In accordance with the disclosure, a base station will determine adjustments to make to the WCD's maximum transmit power per carrier, based on consideration of the WCD's total power headroom and the uplink receive power per carrier. In particular, the base station could first determine the WCD's total power headroom (e.g., as a sum of the WCD's power headroom on the multiple carriers) and could determine a receive power delta per carrier (e.g., as a difference, per carrier, between receive power and target receive power). Given these values, the base station could then effectively re-distribute the WCD's total power headroom among the carriers as changes to the maximum transmit power per carrier in accordance with a relative comparison of the receive power deltas on the carriers. For instance, the base station could compute for each carrier a ratio of (i) the carrier's determined receive power delta to (ii) the sum of the receive power deltas of the multiple carriers, and the base station could multiply the total power headroom by that ratio so as to determine an adjustment to make to the WCD's maximum transmit power for that carrier.

With this distribution of the total power headroom proportionately among the carriers' respective maximum transmit powers, the result would be that the total maximum transmit power (cumulatively across the carriers) would differ from the WCD's allowed maximum transmit power. To address this, the base station could further shift each carrier's adjusted maximum transmit power, while maintaining the difference between the adjusted maximum transmit powers, to the point that the sum of the carriers' maximum transmit powers equals the WCD's allowed total maximum transmit power.

Thus, in one respect, disclosed is a method of controlling WCD transmit power on a plurality of carriers on which the WCD is being served by a base station, where the WCD has a maximum transmit power respectively per carrier, and wherein the WCD has a total maximum transmit power.

As disclosed, the method includes the base station determining a total power headroom of the WCD, and the method includes the base station determining, respectively per carrier, a receive power delta between (i) a target receive power for receiving by the base station from the WCD on the carrier and (ii) an actual receive power at which the base station receives from the WCD on the carrier. The method then includes the base station proportionately allocating the determined total power headroom as adjustments to the WCD's maximum transmit power per carrier, with the allocation per carrier being proportional to a ratio of (i) the determined receive power delta of the carrier to (ii) a sum of the determined receive power deltas of the plurality of carriers. And the method then further includes shifting the adjusted maximum transmit powers of the carriers sufficiently to bring a sum of the maximum transmit powers of the carriers in line with the WCD's total maximum transmit power, thereby establishing a shifted adjusted maximum transmit power per carrier.

Further, in another respect, disclosed is a method of power at which a WCD transmits to a base station on multiple carriers on which the WCD is being served by the base station with carrier aggregation service, where the WCD has a maximum total transmit power, and where, respectively per carrier (i) the WCD has a maximum transmit power, (ii) the WCD has a current transmit power, and (iii) the base station has a target receive power for receiving on the carrier from the WCD.

As disclosed, the method includes determining a total power headroom of the WCD, where the total power headroom is a difference between the WCD's maximum total transmit power level and a sum of the WCD's per-carrier current transmit powers. Further, the method includes determining respectively per carrier a receive power delta, where the receive power delta is a difference between (a) the target receive power for receiving on the carrier from the WCD and (b) an actual receive power at which the base station receives on the carrier from the WCD. The method then includes proportionately allocating the determined total power headroom as adjustments respectively to the WCD's maximum transmit power per carrier in accordance with a comparison of the carriers' determined receive power deltas, and shifting the adjustments so that their sum is substantially zero (e.g., give or take several milliwats). And the method includes directing the WCD to apply the shifted maximum transmit power adjustments to the carriers.

Still further, disclosed is a base station that is configured to control WCD transmission power, where the base station includes an antenna structure for engaging in air interface communication, and the base station includes a controller configured to control maximum transmit power of a WCD served by the base station when the base station serves the WCD on a plurality of carriers and the WCD has a maximum transmit power respectively per carrier, where the WCD further has a maximum total transmit power.

As disclosed, the controller controls the maximum transmit power of the WCD by carrying out operations like those noted above. For example, the operations could include determining a total power headroom of the WCD, and the operations could include determining respectively per carrier a receive power delta, where the receive power delta is a difference between (a) the target receive power for receiving on the carrier from the WCD and (b) an actual receive power at which the base station receives on the carrier from the WCD. Still further, the operations could include proportionately allocating the determined total power headroom as adjustments respectively to the WCD's maximum transmit power per carrier, where the allocation per carrier is proportional to a ratio of (i) the determined receive power delta of the carrier to (ii) a sum of the determined receive power deltas of the plurality of carriers. And the operations include shifting the adjusted maximum transmit power per carrier so as to bring the sum of the maximum transmit powers in line with the WCD's maximum total transmit power. In turn, operations then include causing the base station to transmit to the WCD, via the antenna structure, a control signal that directs the WCD to implement the established maximum transmit power per carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
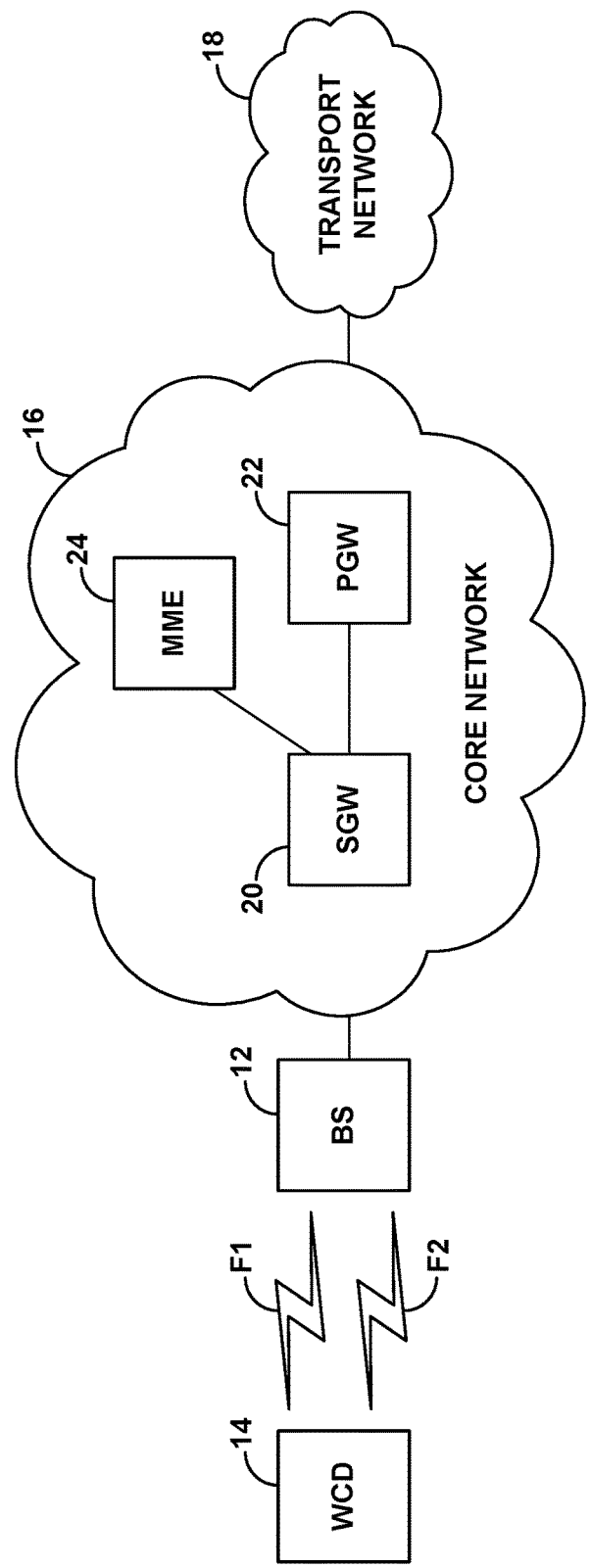
FIG. 1 is a simplified block diagram of an example LTE network.

Referring to the drawings, as noted above, FIG. 1 is a simplified block diagram of an example LTE network. This network functions primarily to serve WCDs with wireless packet-data communication service, including possibly voice-over-packet service, but may also provide other functions. As shown, the LTE network includes a representative LTE base station (evolved Node-B (eNodeB)) 12, which would have an antenna structure and associated equipment for providing respective LTE coverage in which to serve WCDs such as a representative WCD 14. This base station could take any of a variety of forms, such as a macro base station, a small cell base station, and/or a relay base station, among other possibilities. Likewise, the WCD could take various forms, such as any of those noted above for instance.

As shown, the base station has a communication interface with a core network 16 that provides connectivity with a transport network 18 such as the Internet. In particular, the core network includes a serving gateway (SGW) 20 and a packet-data-network gateway (PGW) 22, which cooperatively operate to pass packet-data between the transport network 18 and the base station 12. Further, the core network includes a mobility management entity (MME) 24, which functions as a controller to set up bearer communication tunnels for carrying WCD communications and the like.

In the example arrangement, the base station is shown serving WCD 14 on a plurality of carriers. Two carriers F1, F2 are shown for illustration, but the base station could be serving the WCD on a greater number of carriers, and the disclosed operations could apply with a different number of carriers as well. Each of these carriers would define a respective downlink and uplink and could be either FDD or TDD, in either case having a defined frequency bandwidth for carrying air interface communications between the base station and the WCD.

An LTE air interface on each of these carriers is subdivided in both time and frequency to define an array of resource elements for carrying modulated communications between the base station and WCDs, with each resource element occupying a 15 kHz subcarrier and 66.7 microseconds.

Further, certain resource elements on the air interface are reserved to define channels for carrying particular types of communications between the base station and WCDs. For instance, on the downlink, certain resource elements are reserved to define a control region for carrying control signaling from the base station to WCDs, and other resource elements, grouped into resource blocks, are reserved to define a shared channel for carrying scheduled data communications from the base station to particular WCDs. And on the uplink, certain resource elements are reserved to define a control region for carrying control signaling from WCDs to the base station, and other resource elements, grouped into resource blocks, are reserved to define a shared channel for carrying scheduled data communications from WCDs to the base station.

In practice with the illustrated arrangement, the base station could be providing WCD 14 with carrier aggregation service. In particular, the WCD and base station could have engaged in signaling with each other to establish a radio-link layer connection, as a Radio Resource Control (RRC) connection, that encompasses the two illustrated carriers F1, F2, and so the WCD and base station could be set to communicate with each other concurrently on the two carriers. By standard, with carrier aggregation service, one of these carriers could be deemed a primary component carrier (PCC), and the other could be deemed a secondary component carrier (SCC). Depending on the implementation, the PCC could then carry control signaling for both carriers, or each carrier could carry its own control signaling.

As the base station serves the WCD in this arrangement, the base station may coordinate transmission of packet-data to and from the WCD concurrently on the two carriers. For example, when the base station receives packet-data destined to the WCD, the base station may allocate certain downlink resource blocks respectively on each carrier to cooperatively carry the data, and the base station may transmit to the WCD one or more control signals designating the allocated downlink resources and transmit the data to the WCD in the allocated resources. And when the WCD has data to transmit, the WCD may send a scheduling request control signal to the base station, the base may allocate certain uplink shared channel resource blocks respectively on each carrier to cooperatively carry the data and may transmit to the WCD one or more control signals designating the allocated uplink resources, and the WCD may transmit the data to the base station in the allocated resources.

As noted above, as the base station serves the WCD, the base station and WCD would also engage in uplink power control and power-headroom reporting, both on a per-carrier basis.

As to uplink power control on each carrier, as noted above, the WCD could be set to use a particular transmit power for shared channel transmissions (and/or for other transmissions) on the carrier, perhaps starting with a default or designated transmit power level. And as the base station receives those transmission from the WCD, the base station could measure the receive power (e.g., receive signal strength, as energy level) of those transmissions and compare the measured receive power with a target receive power level for the carrier, to determine whether to direct the WCD to increase or decrease its uplink transmit power.

If the base station determines that the receive power is higher than the target receive power, then the base station could transmit to the WCD a power-down command that causes the WCD to incrementally decrease its uplink transmit power on the carrier. Whereas, if the base station determines that the receive power is lower than the target receive power, then the base station could transmit to the WCD a power-up command that causes the WCD to incrementally increase its uplink transmit power on the carrier. In practice, the base station could send these power-control commands to the WCD as control signals respectively on each carrier, or the base station could send the power control commands for both carriers as one or more signaling messages on the PCC.

As the WCD receives these power-control commands per carrier, the WCD would adjust the transmit power that the WCD is set to use for uplink transmission on the carrier. And the WCD would use its current set transmit power for transmission on the carrier. In particular, when the base station allocates a set of uplink resource blocks on a carrier for use by the to carry transmission from the WCD in a given transmission time interval, the WCD could divide its set transmit power among the resource blocks to determine a per resource block transmit power and could transmit in each allocated resource block on the carrier at that power level.

To facilitate this process, the base station could establish the target receive power per carrier dynamically based on an evaluation of error rate of communications that the base station receives from the WCD on the carrier, and/or based on one or more other factors. For instance, the base station could regularly evaluate the block error rate, frame error rate, or other error metric of communications received from the WCD on the carrier, and the base station could set or adjust the target receive power to help keep the error rate within an appropriate range. As such, if the base station determines that the error rate of communications from the WCD on the carrier is too high, the base station could incrementally increase the target receive power for that carrier in an effort to reduce the error rate. And if the base station determines that the error rate on the carrier is too low (e.g., unnecessarily low), the base station could incrementally decrease the target receive power for that carrier. In practice, the base station could keep track of the current target receive power per carrier by recording the target receives power levels in a context record for the WCD.

As further noted above, the representative WCD in this arrangement will have a maximum total transmit power that the WCD could use for uplink air interface transmission at any given time. For instance, this maximum transmit power could be a physical limit of a power-amplifier that the WCD uses to build-up signals for air interface transmission and/or could be defined by government regulations or for other reasons, and the WCD could be programmed or otherwise provisioned with an indication of its maximum total power level. Thus, in operation, the WCD could be set to avoid uplink air interface transmission at higher than its maximum total transmit power.

Because the WCD engages in concurrent uplink transmission on the two example carriers, the WCD would thus need to ensure that its total transmit power across those carriers does not exceed its allowed maximum total. To facilitate this in practice, the WCD could allocate its maximum total transmit power among the carriers, with a portion being a respective maximum transmit power for one of the carriers, and the remainder as a respective maximum transmit power for the other carrier. By way of example, as noted above, the WCD could initially divide its maximum total transmit power equally among the carriers or could divide the maxim total transmit power in some other manner initially among the carriers. In practice, the base station could dictate to the WCD how the WCD should divide its maximum transmit power among the carriers, such as by specifying in a control message to the WCD what the allocation should be or by specifying in a control message to the WCD what the maximum transmit power should be respectively on each carrier.

As the base station and WCD engage in the above power control process per carrier, the WCD could thus work to ensure that its transmit power per carrier does not rise above its designated maximum transmit power for that carrier. If the WCD's current uplink transmit power on a carrier is already at the designated maximum for that carrier, then the WCD could decline to raise its transmit power further on that carrier when the base station sends a power-up command for that carrier.

Further, as noted above, the WCD may provide the base station with power-headroom reports per carrier to help facilitate the base station's service of the WCD. For example, each time the WCD sends a scheduling request to the base station, seeking allocation of uplink air interface resources for data transmission from the WCD, the WCD could include or separately transmit to the base station a power-headroom report that specifies the WCD's power-headroom respectively on each of its serving carriers. The reported power headroom per carrier could be a difference between the WCD's maximum transmit power on that carrier and the WCD's current set transmit power on that carrier. And the WCD could designate its power-headroom as a code value that the WCD and base station understand maps with a particular power-headroom or range of power-headroom.

In practice, the base station could use these power-headroom reports from the WCD as a basis to control the number of uplink resource blocks that the base station allocates for use by the WCD at any given time, considering that the more air interface resources on which the WCD transmits at a time, the higher the WCD's overall transmit power may need to be. Normally, the base station could be expected to allocate to the WCD no more than a predefined quantity of uplink resource blocks per unit time. But if the WCD has sufficient power headroom, the base station could allocate to the WCD more uplink resource blocks per unit time, to facilitate greater uplink throughput making use of the WCD's additional available transmit power.

Thus, if the WCD's reported power headroom for a carrier is relatively low, the base station might allocate up to a default number of uplink resource blocks at a time for carrying transmission from the WCD on that carrier. Whereas, if the WCD's reported power headroom for a carrier is relatively high, the base station might allocate a greater number of uplink air interface resources at a time such for carrying transmission from the WCD on the carrier, possibly supporting transmission of more data at a time or supporting more robust data transmission (e.g., using a lower order modulation scheme).

As explained above, the present disclosure provides for the base station to control the WCD's maximum transmit power per carrier when the base station is serving the WCD on multiple carriers. In particular, the disclosure provides for the base station taking into consideration a receive power delta per carrier (e.g., computed by subtracting the receive power on the carrier from the target receive power for the carrier) and establishing a proportional allocation of the total power headroom as adjustments to the maximum transmit power of the carriers, based on a comparison of the receive power deltas of the carriers. And the disclosure further provides for the base station shifting the adjustments, optimally maintaining the difference between the adjustments, so that their total equals zero or in other words so that the sum of the resulting shifted maximum transmit powers of the carriers would be equal to or largely the same as the WCD's maximum total transmit power (e.g., with a tolerance of several milliwatts).

For instance, for each carrier (i) the base station could compute a ratio of the carrier's receive power delta to a sum of the receive power deltas of the carriers, which would be a positive or negative adjustment factor, and (ii) the base station could multiply the total WCD's power headroom by that adjustment factor to establish an adjustment to make to the WCD's maximum transmit power for the carrier. As noted above, applying these adjustments to the maximum transmit power respectively of each carrier would likely result in the total of the carriers' maximum transmit power levels being different than the WCD's maximum total transmit power. And to address this, as noted above, the base station could shift the adjustments so that their total is zero, resulting in no change to the WCD's maximum total transmit power, while maintaining the difference between the established adjustments.

Upon carrying out this analysis for each of the carriers on which the base station is serving the WCD, the base station could then send to the WCD one or more control signals directing the WCD to make the established adjustments to the WCD's maximum transmit power respectively per carrier. For instance, the base station could send to the WCD an RRC connection reconfiguration message (e.g., on the PCC) that directs the WCD to make the established adjustments, and the WCD could responsively make the adjustments. Thus, the WCD would then operate (e.g., controlling its maximum transmit power per carrier and computing and reporting its power headroom per carrier) in accordance with the adjusted maximum transmit power respectively per carrier.

In practice, the power measurements at issue in this process could be in milliwatts (mW) units. (The base station and WCD could carry out the process with respect to decibel-milliwatt (dBm) units of measurement, where a dBm is a ratio in decibels of the power to one milliwatt. (Thus, 0 dBM would correspond with 1 mW, each 3 dBm increase would correspond with approximately a doubling of the power in milliwatts, and each 3 dBm decrease would correspond with approximately a halving of the power in milliwatts.) However, this disclosure will refer to the power measurements in milliwatts for simplicity.

As a specific example of the present process, without limitation, consider a scenario where the WCD's maximum total transmit power is 400 milliwatts (mW), and where the WCD starts with a baseline division of that maximum total transmit power among its two serving carriers, so that the WCD's maximum transmit power per carrier is initially 200 mW. Further, assume that the WCD reports to the base station that the WCD's power headroom on carrier F1 is 20 mW and that the WCD's power headroom on carrier F2 is 10 mW. And assume that, on carrier F1, the base station has computed a receive power delta of 35 mW on carrier F1 (meaning that the receive power on carrier F1 is 35 mW lower than the target receive power on carrier F1) and a receive power delta of −6 mW on carrier F2 (meaning that the receive power on carrier F2 is 6 mW higher than the target receive power on carrier F2).

Given these example assumptions, the base station could compute an adjustment factor for carrier F1 as a ratio of the computed receive power delta on carrier F1 to a sum of the receive power deltas on carriers F1 and F2, i.e.: 35/(35−6) =1.2. And the base station could multiply the WCD's total power headroom of 30 by that adjustment factor to compute an adjustment to make to the WCD's maximum transmit power on carrier F1, namely: 1.2×30=36 mW.

And likewise, the base station could compute an adjustment factor for carrier F2 as a ratio of the computed receive power delta on carrier F2 to a sum of the receive power deltas on carriers F1 and F2, i.e.: −6/(35−6)=−0.2. And the base station could multiply the WCD's total power headroom of 30 by that adjustment factor to compute an adjustment to make to the WCD's maximum transmit power on carrier F2, namely: −0.2×30=−6 mW.

Considering these adjustments, however, it is evident that applying these adjustments to the WCD's maximum transmit power respectively on carrier's F1 and F2 would result in the total maximum transmit power across the carriers being 430 mW, which is 30 mW too high. As noted above, the base station could address this by shifting both of the established adjustments until their sum would be largely zero or in other words until the sum of the adjusted maximum transmit power levels of the carriers would still be largely the same as the WCD's maximum total transmit power. But in doing so, the base station would optimally maintain the difference between the established maximum power adjustments.

Here, the difference between the established maximum power adjustments 36 mW and −6 mW is 42 mW. Thus, given two carriers, the base station could distribute this 42 mW as an increase of 21 mW on carrier F1 and a decrease of 21 mW on carrier F2. In particular, the base station could shift the 36 mW adjustment established for carrier F1 down to 21 mW. And likewise the base station could shift the −6 mW adjustment established for carrier F2 down to −21 mW. Thus, the difference between the adjustments would still be 42 mW, consistent with the analysis done based on the receive power deltas, and the resulting shifted adjusted maximum transmit powers of the carriers would be 221 mW on carrier F1 and 179 mW on carrier F2, still totaling to 400 mW, the WCD's maximum total transmit power.

Given these established shifted adjustments, the base station could then send an RRC connection reconfiguration message to the WCD to direct and thus cause the WCD to make the adjustments. For instance, the base station could send the WCD an RRC message that directs the WCD to increase the WCD's maximum transmit power on carrier F1 by 21 mW and to decrease the WCD's maximum transmit power on carrier F2 by 21 mW. Or the base station could send the WCD an RRC message that directs the WCD to use a maximum transmit power of 221 mW on carrier F1 and to use a maximum transmit power of 179 mW on carrier F2.

Further, the base station could iteratively repeat this process as the base station continues to evaluate the WCD's receive power and so forth, resulting in further shifted adjustments to the WCD's maximum transmit power per carrier.

Figure 2:
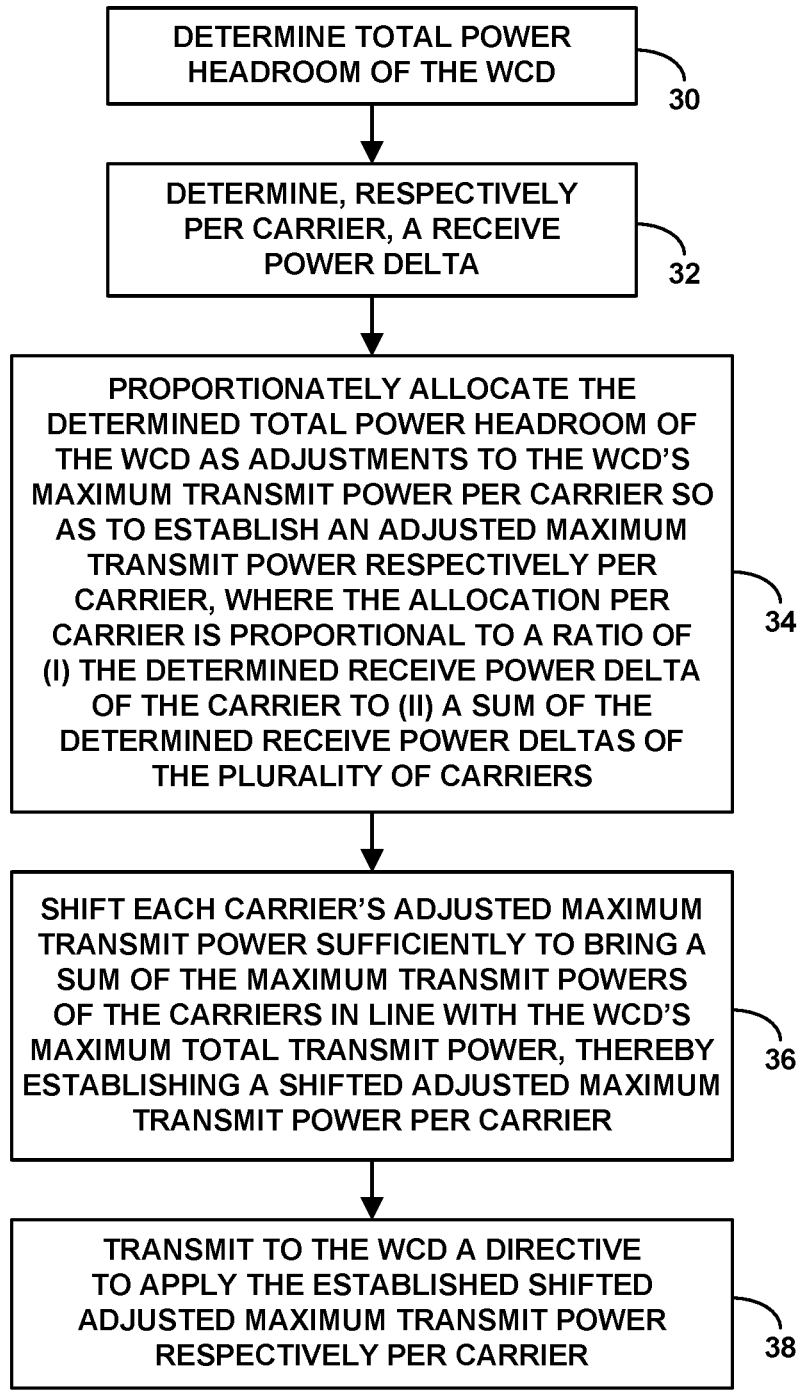
FIG. 2 is a flow chart depicting example operations in accordance with the disclosure.

FIG. 2 is a flow chart depicting operations that can be carried out in accordance with this above discussion, to control a WCD's maximum transmit power on a plurality of carriers on which the WCD is being served by a base station, where the WCD has a maximum transmit power respectively per carrier, and wherein the WCD has a maximum total transmit power (across the carriers). As shown in FIG. 2, at block 30, the base station determines a total power headroom of the WCD. And at block 32 (possibly before or concurrent with block 30), the base station determines, respectively per carrier, a receive power delta between (i) a target receive power for receiving by the base station from the WCD on the carrier and (ii) an actual receive power at which the base station receives from the WCD on the carrier.

At block 34, the base station then proportionately allocates the determined total power headroom of the WCD as adjustments to the WCD's maximum transmit power per carrier so as to establish an adjusted maximum transmit power respectively per carrier, where the allocation per carrier is proportional to a ratio of (i) the determined receive power delta of the carrier to (ii) a sum of the determined receive power deltas of the plurality of carriers. And at block 36 (possibly integrated with block 34), the base station shifts each carrier's adjusted maximum transmit power sufficiently to bring a sum of the maximum transmit powers of the carriers in line with the WCD's maximum total transmit power, thereby establishing a shifted adjusted maximum transmit power per carrier. At block 38, the base station then transmits to the WCD a directive to apply the established shifted adjusted maximum transmit power respectively per carrier.

As explained above, this process could be carried out while the base station provides the WCD with carrier aggregation service on the plurality of carriers, and where each carrier defines downlink and uplink frequency bandwidth for air interface communication between the base station and the WCD. And the process could be carried out iteratively.

Figure 3:
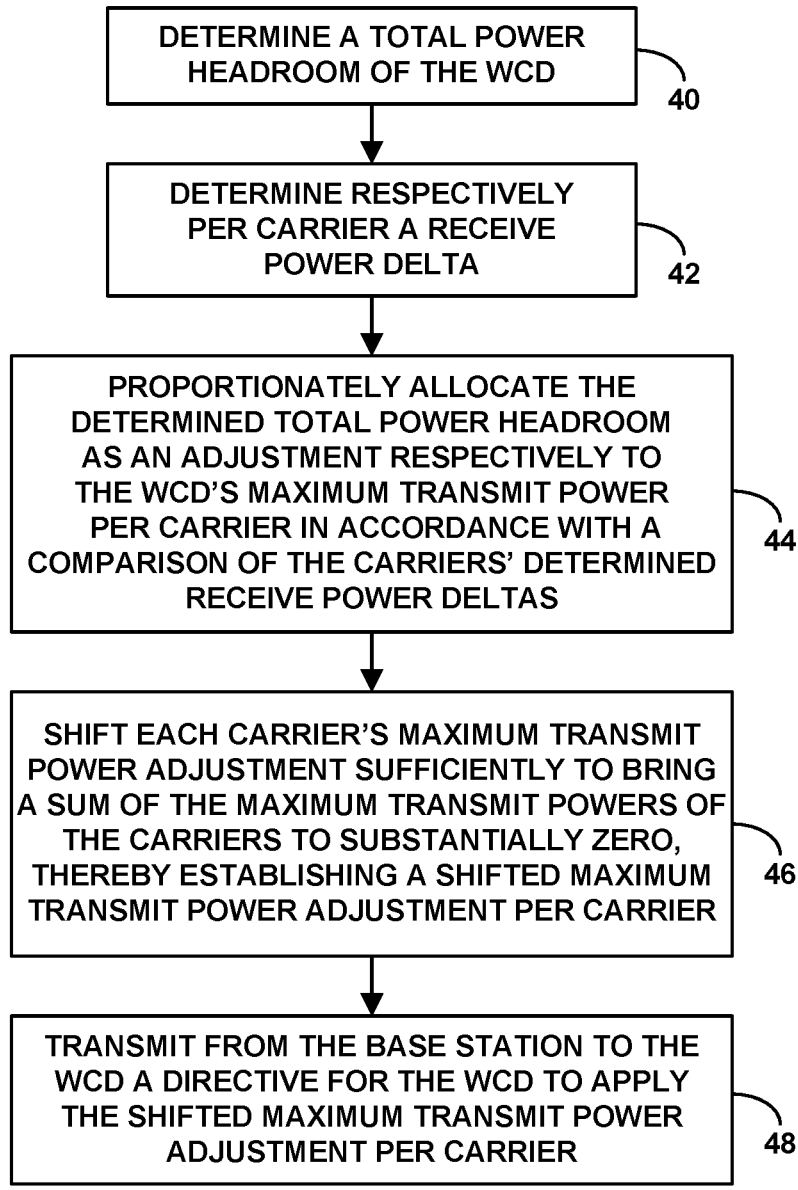
FIG. 3 is another flow chart depicting example operations in accordance with the disclosure.

FIG. 3 is next a flow chart depicting operations of a method that can be carried out in accordance with this above discussion, to control power at which a WCD transmits to a base station on multiple carriers on which the WCD is being served by the base station with carrier aggregation service, where the WCD has a maximum total transmit power, and where, respectively per carrier (i) the WCD has a maximum transmit power, (ii) the WCD has a current transmit power, and (iii) the base station has a target receive power for receiving on the carrier from the WCD.

As shown, at block 40, the method includes determining a total power headroom of the WCD, where the total power headroom is a difference between the WCD's maximum total transmit power level and a sum of the WCD's per-carrier current transmit powers. And at block 42 (possibly before or concurrent with block 40), the method includes determining respectively per carrier a receive power delta, where the receive power delta is a difference between (a) the target receive power for receiving on the carrier from the WCD and (b) an actual receive power at which the base station receives on the carrier from the WCD.

At block 44, the method then includes proportionately allocating the determined total power headroom as an adjustment respectively to the WCD's maximum transmit power per carrier in accordance with a comparison of the carriers' determined receive power deltas. And at block 46 (possibly integrated with block 44), the method includes shifting each carrier's maximum transmit power adjustment sufficiently to bring a sum of the maximum transmit powers of the carriers to substantially zero, thereby establishing a shifted maximum transmit power adjustment per carrier. At block 48, the method then includes transmitting from the base station to the WCD a directive for the WCD to apply the shifted maximum transmit power adjustment per carrier.

In line with the discussion above, in this method, the proportional allocation as an adjustment to the WCD's maximum transmit power respectively per carrier could be in accordance with a ratio of the determined receive power delta for the carrier to a sum of the carriers' determined receive power deltas. Further, the method could be carried out while the base station serves the WCD with carrier aggregation service on the plurality of carriers, each carrier defining downlink and uplink frequency bandwidth for air interface communication between the base station and the WCD. And the method could be carried out iteratively.

Figure 4:
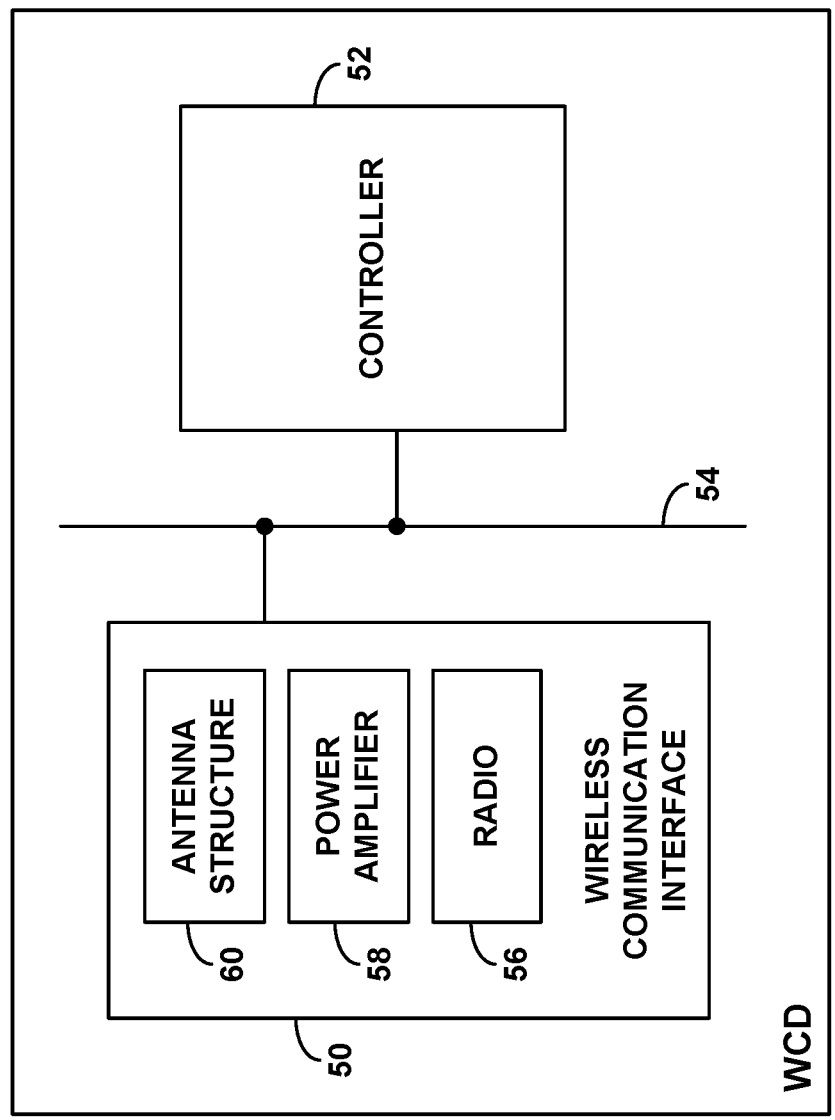
FIG. 4 is a simplified block diagram of an example WCD.

FIG. 4 is next a simplified block diagram of the example WCD 14, showing some of the components that could be included in such a device in an example implementation. As shown, the WCD could include a wireless communication interface 50 and a controller 52, which could be coupled together or otherwise interconnected by a system bus, network, or other connection mechanism 54. Further, these or other components of the WCD could be integrated together in various ways.

In the example WCD, the wireless communication interface 50 could be configured to engage in wireless communication with the base station that serves the WCD, via an air interface encompassing multiple discrete, defined carriers. Thus, as shown, the wireless communication interface could include a radio 56, which could be compliant with LTE or another protocol that the WCD will use for communication with the base station concurrently on the multiple carriers, a power amplifier 58, which could amplify signals separately for air interface transmission on each of the carriers, and an antenna structure 60, which could be configured for transmitting and receiving signals on the air interface.

And the controller 52, which could be part of the wireless communication interface (e.g., part of radio 56), could be configured to control various operations of the WCD, to facilitate the WCD being served by and communicating with the base station. Among other operations, for instance, the controller could be arranged to programmatically control the WCD's power amplifier 58 so as to govern the WCD's uplink transmit power per carrier. As such, the controller could have an indication of the WCD's overall maximum transmit power (e.g., per manufacturer specification), to track the WCD's current transmit power level per carrier, and to engage in power control signaling and power-headroom reporting as discussed above. Further, the controller could manage other WCD operations, such as modulation and demodulation of data for air interface communication, and interworking with the base station to coordinate such communications.

In practice, the WCD controller could include a processing unit, data storage, and program instructions stored in the data storage and executable by the processing unit to carry out these and/or other operations. Alternatively, the controller could take other forms.

Figure 5:
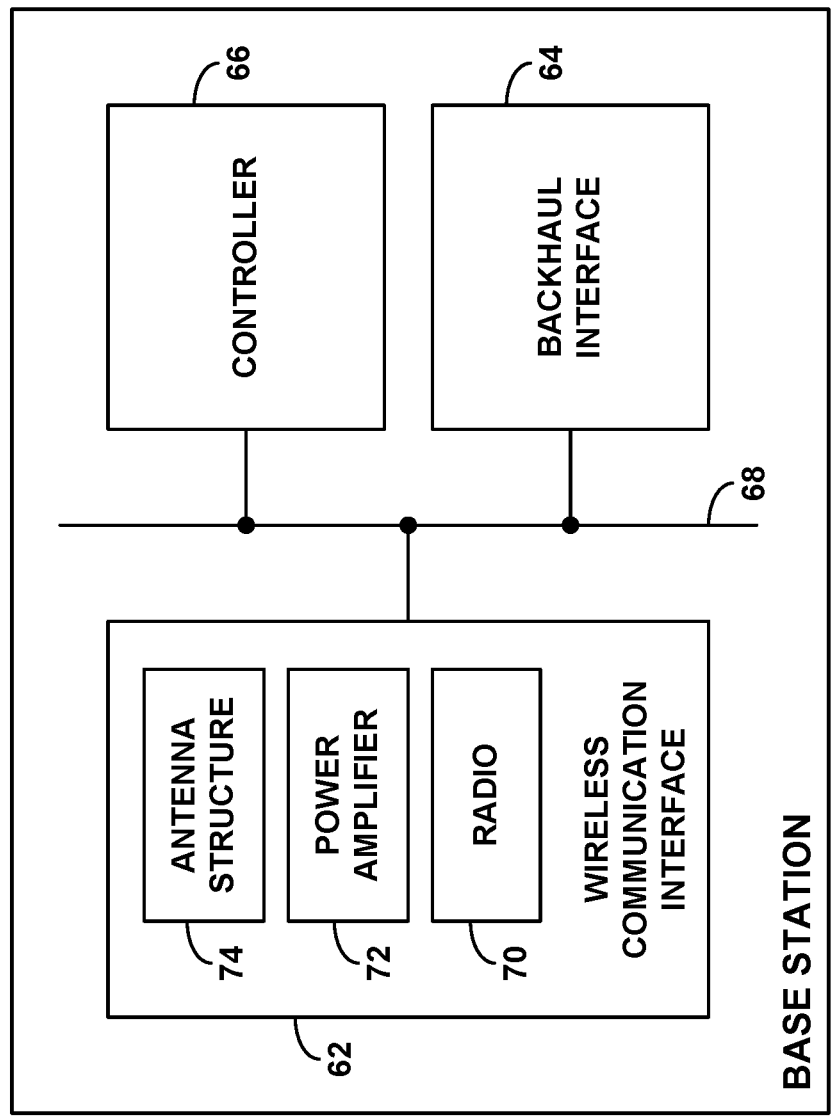
FIG. 5 is a simplified block diagram of an example base station.

FIG. 5 is next a simplified block diagram of an example base station, showing some of the components that the base station could include in an example implementation. As shown, the base station could include a wireless communication interface 62, a backhaul interface 64, and a controller 66, all of which could be coupled together or otherwise interconnected by a system bus, network, or other connection mechanism 68. Further, these or other components of the base station could be integrated together in various ways.

In the example base station, the wireless communication interface 62 could be configured to engage in wireless communication with a served WCD such as WCD 14 via the air interface encompassing the multiple carriers, such as with carrier aggregation service. Thus, as shown, the wireless communication interface could include a radio 70, which could be compliant with LTE or another protocol that the base station will use for communication with the WCD concurrently on the multiple carriers, a power amplifier 72 for amplifying downlink transmissions, and an antenna structure 74 configured for transmitting and receiving signals on the air interface.

And the controller 66, which could be part of the wireless communication interface (e.g., part of radio 70), could be configured to control various operations of the base station, to facilitate the base station serving the WCD and communicating with the WCD. Among other operations, for instance, the controller could cause the base station to engage in an uplink power control process with the WCD, to receive power-headroom reports from the WCD and use the power-head room reports in serving the WCD, and to coordinate downlink and uplink communication with the WCD.

And further, in accordance with the disclosure, the controller could be configured to help manage the WCD's maximum transmit power per carrier. In particular, the controller could be configured to control maximum transmit power of the WCD served by the base station when the base station serves the WCD on a plurality of carriers and the WCD has a maximum transmit power respectively per carrier, where the WCD has a maximum total transmit power.

For instance, the controller could be configured to determine a total power headroom of the WCD, and to determine respectively per carrier a receive power delta, where the receive power delta is a difference between (a) the target receive power for receiving on the carrier from the WCD and (b) an actual receive power at which the base station receives on the carrier from the WCD. Further, the controller could be configured to proportionately allocate the determined total power headroom as an adjustment respectively to the WCD's maximum transmit power per carrier, where the allocation per carrier is proportional to a ratio of (i) the determined receive power delta of the carrier to (ii) a sum of the determined receive power deltas of the plurality of carriers.

And the controller could be configured to shift each carrier's adjusted maximum transmit power sufficiently to bring a sum of the maximum transmit powers of the carriers in line with the WCD's maximum total transmit power, thereby establishing a shifted adjusted maximum transmit power per carrier. (In practice, these steps could be carried out together.) Further, the controller could be configure to cause the base station to transmit to the WCD, via the antenna structure, a directive for the WCD to apply the established shifted adjusted maximum transmit power per carrier.

In practice, the base station controller could include a processing unit, non-transitory data storage, and program instructions stored in the data storage and executable by the processing unit to carry out these and/or other operations. Alternatively, the controller could take other forms. And in line with the discussion above, the controller could carry out these operations iteratively.

Exemplary embodiments have been described above. Those skilled in the art will understand, however, that changes and modifications may be made to these embodiments without departing from the true scope and spirit of the invention.

We claim:

1. A method of controlling wireless communication device (WCD) transmit power on a plurality of carriers on which the WCD is being served by a base station, wherein the WCD has a maximum transmit power respectively per carrier, and wherein the WCD has a maximum total transmit power, the method comprising:
   determining by the base station a total power headroom of the WCD;
   determining by the base station, respectively per carrier, a receive power delta between (i) a target receive power for receiving by the base station from the WCD on the carrier and (ii) an actual receive power at which the base station receives from the WCD on the carrier;
   proportionately allocating by the base station the determined total power headroom of the WCD as adjustments to the WCD's maximum transmit power per carrier so as to establish an adjusted maximum transmit power respectively per carrier, wherein the allocation per carrier is proportional to a ratio of (i) the determined receive power delta of the carrier to (ii) a sum of the determined receive power deltas of the plurality of carriers;
   shifting each carrier's adjusted maximum transmit power sufficiently to bring a sum of the maximum transmit powers of the carriers in line with the WCD's maximum total transmit power, thereby establishing a shifted adjusted maximum transmit power per carrier; and
   transmitting from the base station to the WCD a directive for the WCD to apply the established shifted adjusted maximum transmit power per carrier.

2. The method of claim 1, carried out while the base station provides the WCD with carrier aggregation service on the plurality of carriers.

3. The method of claim 1, wherein each carrier defines downlink and uplink frequency bandwidth for air interface communication between the base station and the WCD.

4. The method of claim 1, wherein determining the total power headroom of the WCD comprises:
   receiving from the WCD a report of power headroom of the WCD respectively per carrier; and
   summing the reported power headroom of the plurality of carriers.

5. The method of claim 1, further comprising establishing by the base station the target receive power per carrier, based on evaluation of error rate of transmissions received by the base station from the WCD.

6. The method of claim 1, wherein transmitting the directive to the WCD comprises transmitting the directive to the WCD in at least one Radio Resource Control (RRC) configuration message.

7. The method of claim 1, carried out iteratively.

8. A method of controlling power at which a wireless communication device (WCD) transmits to a base station on multiple carriers on which the WCD is being served by the base station with carrier aggregation service, wherein the WCD has a maximum total transmit power, and wherein, respectively per carrier (i) the WCD has a maximum transmit power, (ii) the WCD has a current transmit power, and (iii) the base station has a target receive power for receiving on the carrier from the WCD, the method comprising:
   determining a total power headroom of the WCD, wherein the total power headroom is a difference between the WCD's maximum total transmit power level and a sum of the WCD's per-carrier current transmit powers;
   determining respectively per carrier a receive power delta, wherein the receive power delta is a difference between (a) the target receive power for receiving on the carrier from the WCD and (b) an actual receive power at which the base station receives on the carrier from the WCD;
   proportionately allocating the determined total power headroom as an adjustment respectively to the WCD's maximum transmit power per carrier in accordance with a comparison of the carriers' determined receive power deltas;
   shifting each carrier's maximum transmit power adjustments sufficiently to bring a sum of the maximum transmit powers of the carriers to substantially zero, thereby establishing a shifted maximum transmit power adjustment per carrier; and transmitting from the base station to the WCD a directive for the WCD to apply the shifted maximum transmit power adjustment per carrier.

9. The method of claim 8, wherein the proportional allocation as an adjustment to the WCD's maximum transmit power respectively per carrier is in accordance with a ratio of the determined receive power delta for the carrier to a sum of the carriers' determined receive power deltas.

10. The method of claim 8, carried out while the base station provides the WCD with carrier aggregation service on the plurality of carriers.

11. The method of claim 8, wherein each carrier defines downlink and uplink frequency bandwidth for air interface communication between the base station and the WCD.

12. The method of claim 8, wherein determining the total power headroom of the WCD comprises:
   receiving from the WCD a report of power headroom of the WCD respectively per carrier; and
   summing the reported power headroom of the plurality of carriers.

13. The method of claim 8, further comprising establishing by the base station the target receive power per carrier, based on evaluation of error rate of transmissions received by the base station from the WCD.

14. The method of claim 8, wherein transmitting from the base station to the WCD the directive for the WCD to apply the shifted maximum transmit power adjustment per carrier comprises transmitting to the WCD one or more control signals that cause the WCD to apply the shifted maximum transmit power adjustment per carrier.

15. The method of claim 14, wherein the one or more control signals comprises a Radio Resource Control (RRC) configuration message.

16. The method of claim 8, carried out iteratively.

17. A base station comprising:
   an antenna structure for engaging in air interface communication; and
   a controller configured to control maximum transmit power of a wireless communication device (WCD) served by the base station when the base station serves the WCD on a plurality of carriers and the WCD has a maximum transmit power respectively per carrier, wherein the WCD has a maximum total transmit power, and wherein the controller is configured to carry out operations including:
   determining a total power headroom of the WCD,
   determining respectively per carrier a receive power delta, wherein the receive power delta is a difference between (a) the target receive power for receiving on the carrier from the WCD and (b) an actual receive power at which the base station receives on the carrier from the WCD,
   proportionately allocating the determined total power headroom as an adjustment respectively to the WCD's maximum transmit power per carrier, wherein the allocation per carrier is proportional to a ratio of (i) the determined receive power delta of the carrier to (ii) a sum of the determined receive power deltas of the plurality of carriers,
   shifting each carrier's adjusted maximum transmit power sufficiently to bring a sum of the maximum transmit powers of the carriers in line with the WCD's maximum total transmit power, thereby establishing a shifted adjusted maximum transmit power per carrier, and
   causing the base station to transmit to the WCD, via the antenna structure, a directive for the WCD to apply the established shifted adjusted maximum transmit power per carrier.

18. The base station of claim 17, wherein the controller comprises a processing unit, non-transitory data storage, and program instructions stored in the non-transitory data storage and executable by the processing unit to carry out the operations.

19. The base station of claim 17, wherein the controller further establishes the target receive power per carrier, based on evaluation of error rate of transmissions received by the base station from the WCD.

20. The base station of claim 17, wherein the controller carries out the operations iteratively.

* * * * *